(12) United States Patent
Theil et al.

(10) Patent No.: US 6,747,773 B2
(45) Date of Patent: Jun. 8, 2004

(54) METHOD AND STRUCTURE FOR STUB TUNABLE RESONANT CAVITY FOR PHOTONIC CRYSTALS

(75) Inventors: Jeremy A. Theil, Mountain View, CA (US); Mihail M. Sigalas, Santa Clara, CA (US); Storrs T. Hoen, Brisbane, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/284,857

(22) Filed: Oct. 31, 2002

(65) Prior Publication Data

US 2004/0085608 A1 May 6, 2004

(51) Int. Cl.⁷ .................................................. G02F 1/00
(52) U.S. Cl. ...................................................... 359/237
(58) Field of Search ................................ 359/237, 245, 359/248, 250, 578, 587, 588

(56) References Cited

U.S. PATENT DOCUMENTS

| | | | |
|---|---|---|---|
| 5,563,965 A | * 10/1996 | Madabhushi | 385/2 |
| 5,998,298 A | * 12/1999 | Fleming et al. | 438/692 |
| 6,436,488 B1 | 8/2002 | Theil et al. | |
| 6,521,136 B1 | * 2/2003 | Sfez et al. | 216/24 |

OTHER PUBLICATIONS

Lee, Ming–Chang Mark, "Nano–Electro–Mechanical Photonic Crystal Switch", Tuesday Afternoon, OFC 2002, pp. 94–95.

* cited by examiner

Primary Examiner—Tuyen Tra

(57) ABSTRACT

Using a micro-electromechanical actuator, tuning stubs may be actuated for tuning cavities in photonic crystal lattice structures. An actuated tuning stub can be used to tune cavities in both two and three dimensional photonic crystal lattice structures.

20 Claims, 8 Drawing Sheets

METHOD AND STRUCTURE FOR STUB TUNABLE RESONANT CAVITY FOR PHOTONIC CRYSTALS

FIELD OF THE INVENTION

The invention relates to the tuning of cavities in photonic crystal lattice structures.

BACKGROUND

Photonic crystals are periodic structures of high and low refractive index media that confine light of certain wavelengths. Photonic crystals may be used to make a number of optical components such as waveguides and filters.

For optical communications, light in the wavelength range of 1.3 µm to 1.5 µm is typically used because of low absorption in silica waveguides. Hence, this wavelength range is of interest for present-day optical networks. The manufacture of photonic crystals to operate in this wavelength range is typically subject to a high degree of manufacturing variance. Hence, it is desirable for wavelength discrimination applications to have a method and structure to allow tuning of the photonic crystal apparatus to respond to a specific wavelength.

SUMMARY OF THE INVENTION

In accordance with the invention, a movable feature such as a tuning stub is introduced into a photonic crystal that allows for controllable tuning of cavities that are created within the photonic crystal. Cavities to be tuned in accordance with the invention are designed to work in the spectrum from far infrared to hard ultraviolet region. Attaching the feature to an actuator allows the feature to be moved in and out of the photonic crystal for precise tuning. The invention may typically be implemented using either polysilicon or amorphous silicon.

DETAILED DESCRIPTION OF THE INVENTION

Figure 1:
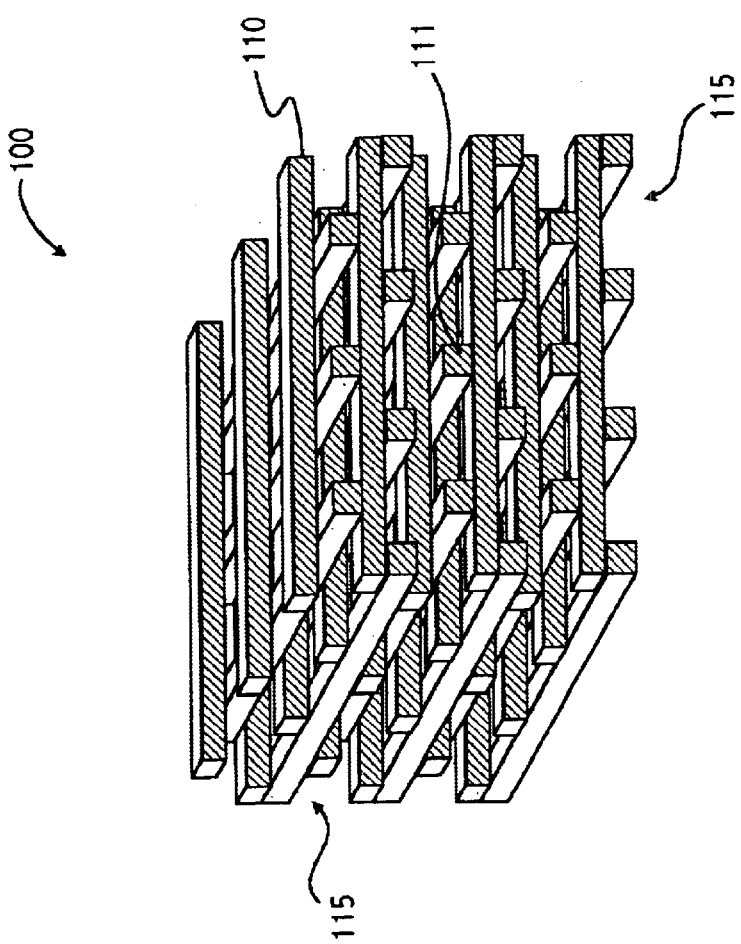
FIG. 1 show a three-dimensional photonic crystal lattice structure in accordance with the invention.

FIG. 1 shows typical three dimensional photonic crystal lattice structure 100 that has face centered cubic symmetry but in accordance with the invention may also have face centered tetragonal symmetry. Bars 110 are typically a solid high refractive index material and either gas or vacuum for low refractive index void regions 115. Note that whereas it is possible to create three-dimensional photonic crystal structures where light propagates through the solid material it is typical to use a vacuum or gas region as the light guiding medium. Bars 110 may have a variety of cross-sectional shapes such as square, rectangular, circular or elliptical with the filling ratio being adjusted to produce photonic band gaps. Typical material for bars 110 is either polysilicon or amorphous silicon. As disclosed in U.S. patent application Ser. No. 10/287,040 entitled "Low temperature Photonic Crystal Structure" by Theil and incorporated by reference, three and two dimensional photonic crystal lattice structures can be made at comparatively low temperatures with amorphous silicon allowing the use of a wide variety of substrates.

Typically, a waveguide is connected to or located close to cavity 245 (see FIG. 2) in photonic crystal lattice 100. The waveguide may be formed by removing single bar 110 from photonic crystal lattice 100, by removing portions of bars 110 in a direction to form a waveguide in a direction perpendicular to bars 110 at a given cross-sectional plane of photonic crystal lattice 100, or a combination of the preceding to construct waveguides with bends. Typically, in photonic crystal lattice structure 100, bars 110 are in contact and arrayed on top of each other to form three dimensional photonic crystal lattice structure 100. To create a tunable cavity, one bar, tuning stub 111 is located to one side of cavity 245 (see FIG. 2) and is not contacting adjacent bars 110 but need not be centered between adjacent bars 110. Tuning stub 111 extends from cavity 245 (see FIG. 2) to the edge of photonic crystal lattice 100. An actuator moves tuning stub 111 in and out of cavity 245 (see FIG. 2) to tune the resonant modes for cavity 245 (see FIG. 2). The actuation of the actuator may be any type typically used in micromachined devices, including thermal expansion, electrostatic actuation, magnetic actuation or piezoelectric distortion.

Figure 2:
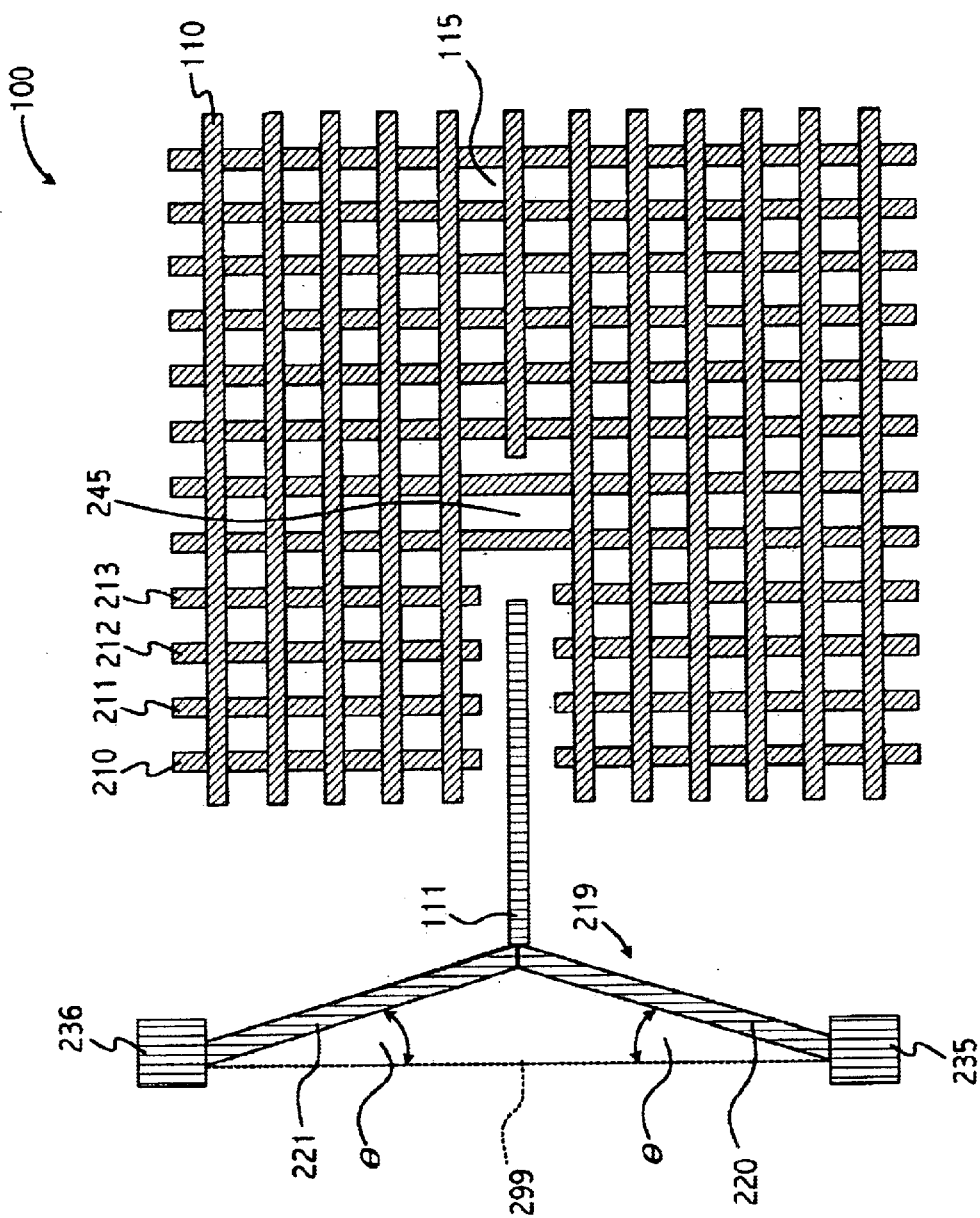
FIG. 2 shows an embodiment in accordance with the invention in a side view with the three-dimensional photonic crystal lattice structure, tuning stub and thermal actuator.

FIG.2 shows an embodiment in accordance with the invention using thermal actuation. Photonic crystal lattice structure 100 is shown in a plane cross-section with tuning stub 111, cavity 245, resistor legs 220, 221 of resistor 219 and resistor pads 235, 236. Resistor pads 235, 236 may be actual pads making connections to an external circuit or connection points within a monolithic circuit. Note that bars 210, 211, 212 and 213 are cut out in the area near tuning stub 111 to allow tuning stub 111 to move in and out of photonic crystal lattice structure 100. Resistor legs 220, 221 of resistor 219 are attached to resistor pads 235, 236, respectively. At the apex of the bend of resistor 219, resistor 219 is attached to tuning stub 111. In the embodiment in FIG. 2, the resistor legs 220, 221 are typically made of the same material used for photonic crystal lattice structure 100. Hence, tuning stub 111 is formed when resistor legs 220, 221 are formed and is made of the same material as resistor legs 220, 221. Tuning stub 111 is simply an extension of resistor legs 220, 221 or one layer of resistor legs 220, 221 as shown in FIG. 3.

Figure 3:
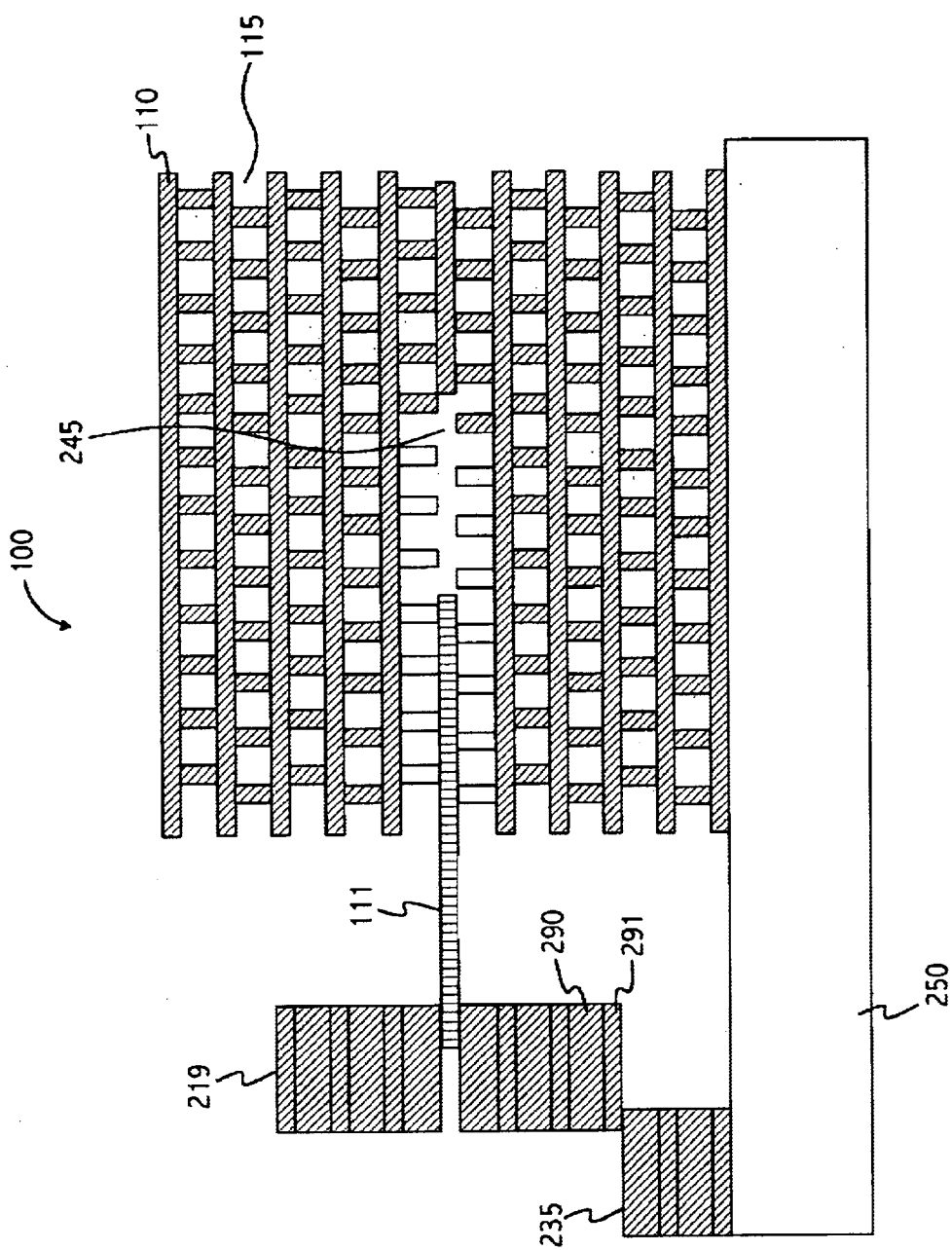
FIG. 3 shows an embodiment in accordance with the invention in a top view with the three-dimensional photonic crystal lattice structure, tuning stub and thermal actuator.

FIG. 3 shows a side view of the embodiment in accordance with the invention shown in FIG. 2 including substrate 250, for example, a wafer coated with silicon nitride. A convenient material to select for resistor 219 is polysilicon or amorphous silicon as it allows fabrication of resistor 219 at the same time as tuning stub 111. Part of tuning stub 111 may be reinforced by use of multiple layers as shown in FIG.

3. Typically, the number of layers used to form resistor 219 and resistor pads 235, 236 are selected to provide adequate stiffness and anchoring strength. An important consideration in creating an actuator and resistor 219 in particular is fixing the direction of motion when powered. The bend of resistor 219 serves to define legs 220, 221 and a driving force towards the apex of the bend of resistor 219. When resistor 219 is fabricated using thin film technology it is possible to make resistor 219 have a greater width (in plane of resistor 219) than thickness (out of plane of resistor 219). Hence, resistor 219 would tend to move in and out of the resistor plane with such geometry. To minimize this effect, the ratio of thickness to width should be at least two to one and typically would exceed a ratio of thickness to width of five to one. To achieve this the entire layer making up resistor 219 may be etched or deposited at one time or resistor 219 may be divided into layers (see FIG. 3) so that each layer of resistor 219 corresponds to a layer in photonic crystal lattice structure 100.

When semiconductor materials are used for making resistor 219, a way to adjust the resistivity of the semiconductor material is to add dopants to a semiconductor layer or layers. For example, the resistivity of layers 290, 291 could be lowered by doping and layers 290, 291 would carry the current but all layers in resistor 219 would reach about the same temperature. Doping need not be limited to layers 290, 291. However, typically, doped layers would be adjacent to one another and at least one doped layer would be electrically connected to resistor pads 235, 236. Typically, the doped layers are located in the middle of the layers making up resistor 219 to ensure that resistor 219 is heated uniformly across the resistor layers. In FIG. 3, the typical location of the doped layers would be immediately adjacent to tuning stub 111.

Alternatively, materials may be used for resistor 219 that are not the same as those in photonic crystal lattice structure 100 which necessitates connecting resistor 219 to tuning stub 111 either by mechanical means or by adhesion between tuning stub 111 and resistor 219. Resistor 219 need not be made of one material, but if the thermal coefficient of expansion is different for the two materials out of plane stresses might become an issue. Such stresses may be significantly reduced by creating symmetric layers of films in resistor 219 so that the thermal stresses cancel.

Operationally, when a current flows through resistor 219, resistor legs 220, 221 heat up and expand, causing tuning stub 111 to move toward the right in FIGS. 2 and 3. Decreasing the angle $\theta$ of resistor legs 220, 221 with respect to line 299 connecting resistor pads 235, 236 eventually causes self-buckling and can be used to amplify the distance tuning stub 111 is moved with respect to the relatively small length changes of resistor legs 220, 221. The displacement $\Delta x$ of tuning stub 111 can be approximated by the following equation:

$$\Delta x = L_0 \sin(\theta) \left( \sqrt{1 + \frac{2C_{TE}\Delta T}{\sin^2(\theta)}} - 1 \right) \quad (1)$$

where $L_0$ is the length of each resistor leg 220 and 221, $\theta$ is the angle between resistor legs 220, 221 and line 299, $C_{TE}$ is the linear coefficient of thermal expansion of resistor 219 at the bend and $\Delta T$ is the change in temperature from ambient conditions and is assumed constant along each resistor leg 220 and 221. If only modest changes in length with temperature are considered ($C_{TE}\Delta T \ll \sin^2\theta$), Eq. (1) simplifies to:

$$\Delta x = \frac{L_0 C_{TE} \Delta T}{\sin\theta} \quad (2)$$

Typical displacements for the 1.5 $\mu$m applications are on the order of $10^{-7}$ m. Because the temperature of resistor 219 is directly related to the power dissipated by resistor 219, an actuator with the desired displacement can be designed to operate over a desired voltage range.

The temperature distribution along resistor leg 220 is typically not constant and may be determined as follows. Resistor leg 220 is assumed to be uniformly doped so that electrical conduction is uniform through the full thickness of the beam. It is assumed that the thermal conduction occurs principally along resistor legs 220, 221 and not through the air or gas that surrounds resistor legs 220, 221. The differential temperature distribution along resistor leg 220 is then given by:

$$T(z) - T_0 = \rho I^2 (L^2 - z^2)/A^2\kappa \quad (3)$$

where $T_0$ is the temperature of the surrounding medium, $\rho$ is the resistivity of the beam which is assumed constant, I is the current, A is the cross-sectional area of the beam, $\kappa$ is the thermal diffusivity of the beam which is also assumed constant, L is the length of resistor leg 220 or 221 from resistor pad 235 or 236, respectively, to tuning stub 111 and z is the distance from where tuning stub 111 connects to resistor leg 220.

The length of the beam L may be related to the desired displacement $\Delta x$ of the tuning stub such as tuning stub 111 and the operating voltage $V_b$ using Eq. (2) and replacing the quantity $L_0\Delta T$ with $$\int_0^L \frac{\rho I^2 (L^2 - z^2) dz}{A^2 \kappa}$$

(see Eq. (3)) to get:

$$\Delta x = \frac{L C_{TE} V_b^2}{6\kappa\rho\sin\theta} \quad (4)$$

The temperature change from ambient conditions $\Delta T$ of the beam at the point (x=0) contacting the tuning stub, for example, tuning stub 111 is then given by:

$$\Delta T = \frac{V_b^2}{4\kappa\rho} \quad (5)$$

In accordance with an embodiment of the invention, a typical value for $\kappa$ is approximately 140 W/m° C. based on lightly doped polysilicon, see for example Tai and Muller, "Lightly Doped Polysilicon Bridge as an Anemometer," Proceedings of the 4th International Conference on Solid State Sensors and Actuators, 1987, pp. 360–363. In typical applications $\kappa$ depends on the temperature, polysilicon grain size and weakly on the doping. The resistivity $\rho$ depends on the doping of the polysilicon and typically varies between about 100 m$\Omega$cm and 0.3 m$\Omega$cm when the doping level is varied between about $10^{19}$ cm$^{-3}$ and $10^{21}$ cm$^{-3}$, see for example, Obermeier et al. "Characteristics of polysilicon layers and their applications in sensors", Proceedings of Solid State Sensors Workshop, 1986. A typical choice for $\rho$ in accordance with an embodiment of the invention is about 10 mΩcm. The linear coefficient of thermal expansion $C_{TE}$ is about $2.3 \times 10^{-6}/°$ C. for polysilicon and is weakly dependent on doping, polysilicon grain size and temperature.

With reference to FIGS. 2 and 3, an exemplary embodiment in accordance with the invention, assuming polysilicon, having resistor legs 220, 221 each with a length L equal to 300 μm and a bend angle θ of about 10°, provides a displacement Δx of tuning stub 111 equal to about 427 nm with an operational voltage $V_b$ of about 3 V which is typically adequate for filter tuning. The temperature rise above ambient is about 160° C. at the point where tuning stub 111 connects to resistor legs 220, 221. Taking resistor legs 220, 221 to have a cross-section of 1.2 μm by 5 μm the power drawn by the stub tuner is about 0.3 mW.

Figure 4:
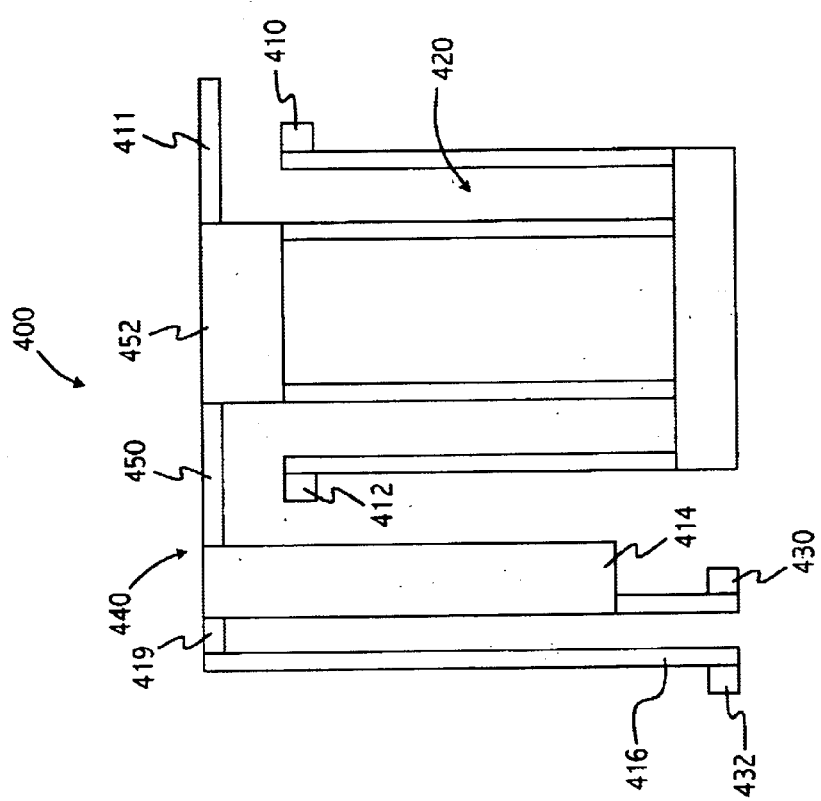
FIG. 4 shows a thermal expansion actuator in accordance with the invention.

FIG. 4 shows an embodiment in accordance with the invention for actuating a tuning stub using a thermal expansion actuator. Mechanical anchors 410, 412, 430 and 432 anchor actuator structure 400 to the underlying substrate. Current is directed through arms 416 and 414, entering on arm 416 and exiting on arm 414. Arms 416, 414 are typically made of polysilicon or amorphous silicon as is typically the rest of actuator structure 400. When current is passed from anchor 432 to anchor 430 through arms 416 and 414, the larger current density in arm 416 compared to arm 414 causes arm 416 to heat and expand more than arm 414. Because arms 414 and 416 are joined at their free ends by beam 419, thermal actuator end 440 is deflected toward the right in an arcing motion. Folded beam flexure 420 is connected by connecting beam 450 to thermal actuator end 440 to linearize the motion of tuning stub 411. Connecting beam 450 is comparatively thin and long so that as thermal actuator end 440 moves in an arcing motion, beam 450 bends to allow rigid floating element to move tuning stub 411 in a straight line into the photonic crystal, for example, photonic crystal 100.

An exemplary embodiment in accordance with the invention has arm 416 with dimensions of about 200 μm in length, about 2 μm width and about 5 μm thick. Arm 414 is about 160 μm long, about 20 μm wide and has a thickness similar to arm 416. Arm 414 is connected to anchor 430 by arm 418. Arm 418 is about 40 μm long, about 2 μm wide and about 5 μm thick. The arms of fold beam flexure 420 are typically similar in dimension to arm 416, giving about 200 μm for the length, about 2 μm for the width and about 5 μm thick. Beam 450 is typically about 1 μm in width, about 100 μm in length and also about 5 μm thick to allow easy bending. Tuning stub 411 deflects about 3.2 μm when arm 416 is heated about 800° C. above ambient so that a 0.4 μm deflection occurs for the heating of arm 416 for about 100° C. heating above ambient. The 100° C. heating can be achieved with a voltage of about 3 V and a current of about 1 mA. More details regarding the structure may be found in Guckel et al., "Thermo-magnetic metal flexure actuators", Solid-State Sensor Workshop. Hilton Head Island, S.C., pp.73–74, 1992 and Comtois and Bright,"Applications for surface micromachined polysilicon thermal actuators and arrays, Sensors and Actuators, A58, 1997, pp. 19–25 which are incorporated by reference.

Figure 5:
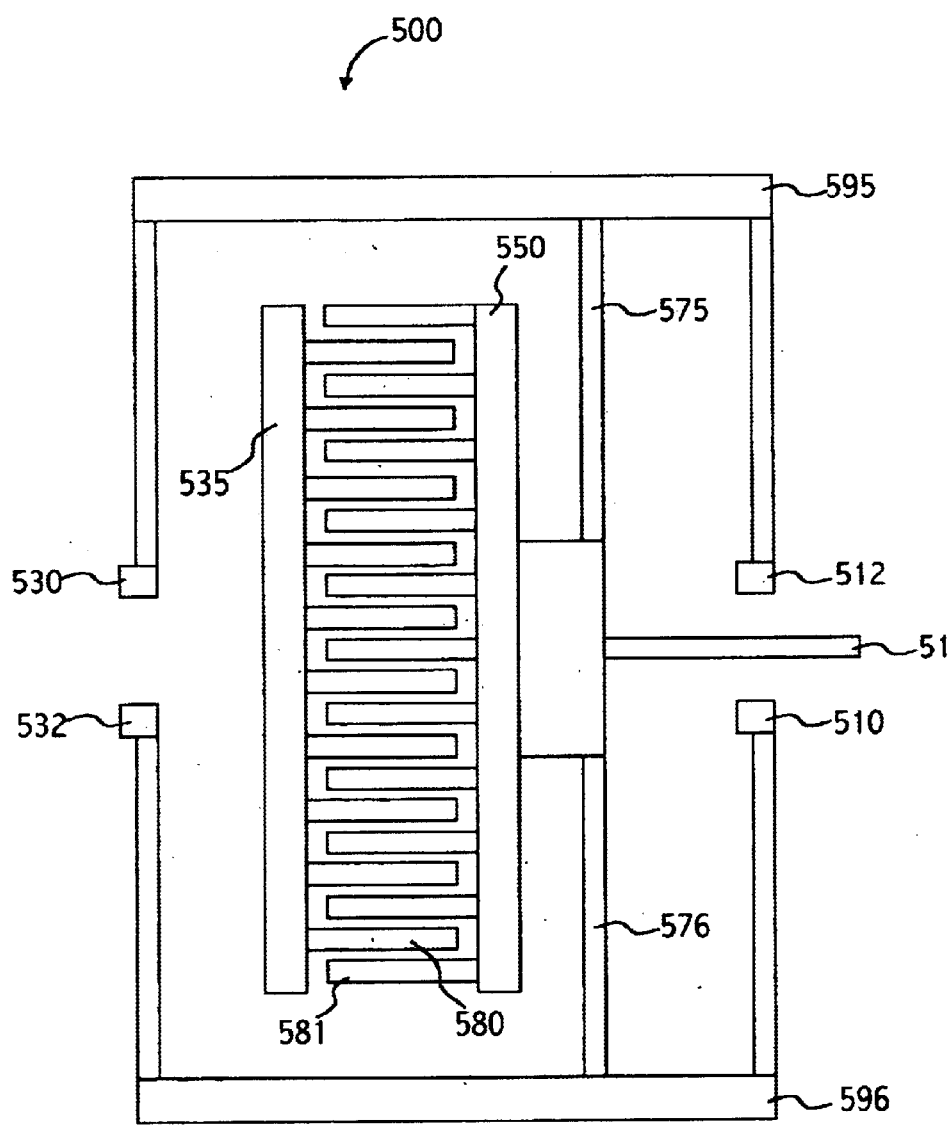
FIG. 5 shows an electrostatic actuator in accordance with an embodiment of the invention.

FIG. 5 shows an embodiment in accordance with the invention for actuating a tuning stub using an electrostatic actuator. Mechanical anchors 510, 512, 530 and 532 attach electrostatic actuator 500 to the underlying substrate. Comb electrode 535 is attached to the underlying substrate and typically held at a bias voltage $V_b$, to actuate tuning stub 511. Comb electrode 550 is attached to tuning stub 511 and typically held at electrical ground to actuate tuning stub 511. Flexure beams 575, 576 function to support comb electrode 550 and confine the motion of tuning stub 511 in the horizontal direction.

If the gap between comb fingers 580 and 581 is given by d, the bias voltage is $V_b$, and the depth of each comb finger is given by b, the force produced by an N unit cell comb drive is given by:

$$F = \frac{2N\varepsilon_0 b V_b^2}{d} \qquad (6)$$

where N is the number of comb fingers. An exemplary embodiment in accordance with the invention shown in FIG. 5 has flexures 575 and 576 that are about 200 μm long, about 1 μm wide and about 5 μm deep. The spring constant for flexures 575 and 576 is then about 0.11 N/m. With the flexure arrangement as shown in FIG. 5, electrostatic actuator 500 will then have a net spring constant of 0.22 N/m. Moving tuning stub 511 a distance of about 0.4 μm then requires a force of about 0.088 μN. Taking each comb finger 581 to be about 5 μm long, about 1 μm wide and about 5 μm deep with a gap between comb fingers 581 of 1 μm and a total of 110 unit cells between floating links 595 and 596 gives $F = 9.735 \times 10^{-9} V_b^2$. Therefore, to produce a displacement of tuning stub 511 equal to about 0.4 μm requires a bias voltage $V_b$ of 3.5 V.

Figure 6:
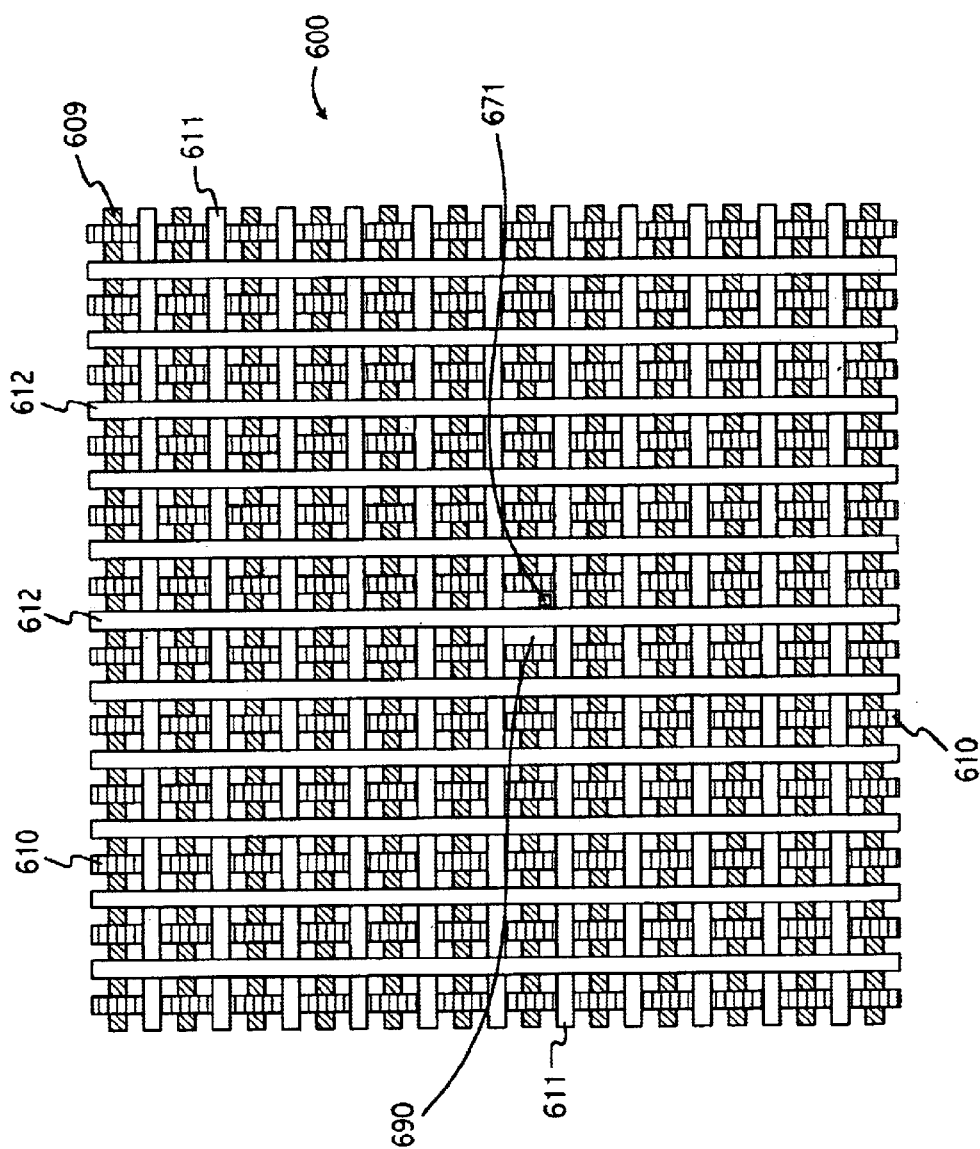
FIG. 6 shows a top or bottom view of a threeimensional photonic crystal lattice structure with tuning stub and cavity in accordance with an embodiment of the invention.

FIG. 6 shows an embodiment in accordance with the invention. FIG. 6 shows a view from underneath three-dimensional photonic crystal lattice structure 600 with tuning stub 671 entering photonic crystal lattice structure 600 from the upper face. Photonic crystal lattice structure 600 typically has face centered cubic symmetry but may also be, for example, face centered tetragonal. Tuning stub 671 is inserted between the lattice bars. Tuning stub 671 is typically oriented in a substantially vertical position and typically enters photonic crystal lattice structure 600 from either the top or the bottom crystal face. Tuning stub 671 is positioned to avoid contact with lattice bars 609, 610, 611 and 612 which each make up a corresponding layer of photonic crystal lattice structure 600. Cavity 690 is created by removing part of one of bars 609. Tuning stub 671 is actuated to move up or down for tuning. At resonance the fields are localized around cavity 690, so for maximal effect tuning stub 671 should be located as close as possible to cavity 690.

Figure 7:
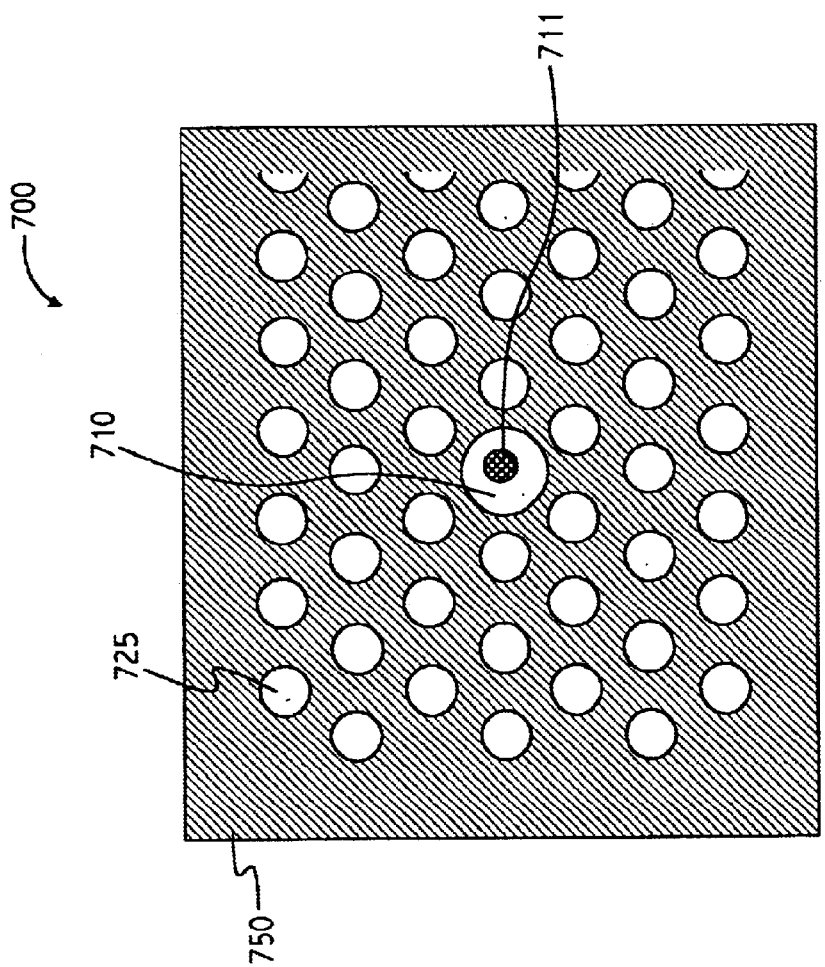
FIG. 7 shows a top or bottom view of two-dimensional photonic crystal lattice showing tuning stub and cavity in accordance with an embodiment of the invention.

FIG. 7 shows an embodiment in accordance with the invention for tuning cavity 710 in two-dimensional photonic crystal lattice structure 700 in a top or bottom view. Two-dimensional photonic crystal lattice structure 700 has a periodic structure of low refractive index regions in a higher refractive index material. For example, circular air holes 725 form the periodic structure in higher refractive index material 750. Tuning stub 711 is typically introduced into cavity 711 in two-dimensional photonic crystal lattice structure 700 from the top or bottom as shown in FIG. 7 and need not be through the center of cavity 711 by may be offset a distance from the center as shown. Tuning stub 711 is actuated to move up or down for tuning using, for example, a parallel plate type actuator similar to parallel plate type actuator 800 in FIG. 8.

Figure 8:
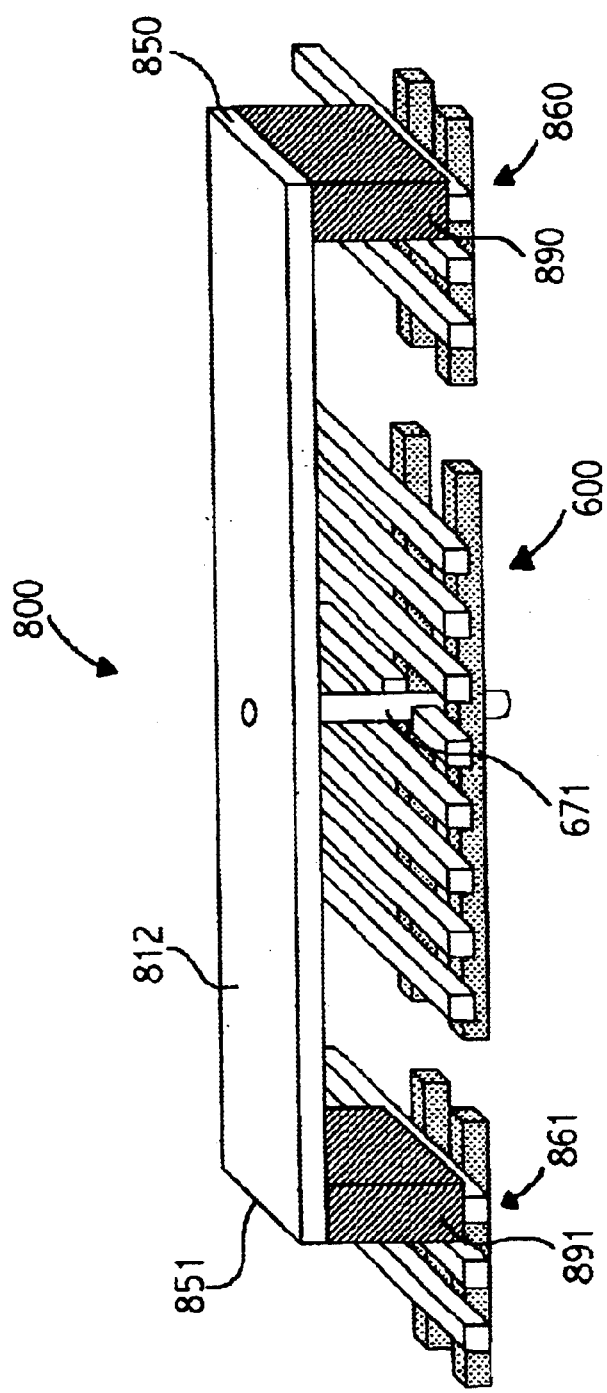
FIG. 8 shows a parallel plate actuator in accordance with an embodiment of the invention

FIG. 8 shows an embodiment in accordance with the invention of parallel plate type actuator 800 for use with structure shown in FIG. 6. The embodiment may easily be adapted to serve as the actuator for the structure shown in FIG. 7. Actuator 800 provides vertical motion for tuning stub 671. Tuning stub 671 is typically held in the center of flat membrane 812 which is typically polysilicon or amorphous silicon. Flat membrane 812 is supported at both ends 850 and 851, respectively, by rigid supports 890 and 891 that suspend flat membrane 812 above three-dimensional photonic crystal lattice structure 600 at a distance, d, that is sufficient to prevent the well-known snap down instability associated with parallel plate type actuators. Rigid supports 890 and 891 are connected mechanically and electrically to photonic crystal lattices 860 and 861, respectively. Photonic crystal lattice structures 860 and 861 are electrically isolated from photonic crystal lattice structure 600 so that a potential difference may be applied between flat membrane 812 and photonic crystal lattice structure 600. Photonic crystal lattice structures 600, 860 and 861 are shown here for simplicity as having two layers of bars while, typically, photonic crystal lattice structures 600, 860 and 861 would have many more layers. Because photonic crystal lattice structures 860 and 861 typically need not be optically active, photonic crystal lattice structures 860 and 861 may be replaced with other rigid structures known to those skilled in the art that provide electrical contact to supports 890 and 891.

Motion of tuning stub 671 is predominately in the linear regime. A non-linearity, tension stiffening, occurs with membrane 812 at larger deflections because neither of membrane ends 890 891 is free to move as both membrane ends 890, 891 are attached. In operation a bias voltage $V_b$ is applied to membrane 812 while three-dimensional photonic crystal lattice 600 is kept at ground. If A is the effective area of membrane 812, the force exerted by actuator 800 in a first order approximation valid in the linear regime is:

$$F = \frac{\varepsilon_0 A V_b^2}{2d^2} \quad (7)$$

Taking the spring constant k to be:

$$k = 16 \frac{Ewt^3}{L^3} \quad (8)$$

where E is the Young's modulus, w is the width, t the thickness and L the length of membrane 812. The displacement x for a given bias voltage is then given by:

$$x = F/k \quad (9)$$

with F and k as given by Eqs.(7) and (8), respectively.

In an exemplary embodiment in accordance with the invention, to achieve a deflection of about 0.4 μm for actuator 800 assuming membrane 812 is polysilicon, membrane 812 has a width of about 10 μm, a thickness of about 0.4 μm, a length of about 400 μm and is suspended about 2 μm above three-dimensional photonic crystal lattice 600 (see FIG. 8) or above two-dimensional photonic crystal lattice 700 (not shown) requires a bias voltage $V_b$ of about 1.6 V. The spring constant for membrane 812 is about 0.027 N/m.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

What is claimed is:

1. A tunable three-dimensional photonic crystal lattice structure comprising:
   a region having a tunable cavity;
   a movable stub tuner penetrating into said tunable cavity; and
   an actuator coupled to said movable stub tuner for moving said movable stub tuner to tune said tunable cavity.

2. The structure of claim 1 wherein said tunable three-dimensional photonic crystal lattice structure has substantially face centered cubic symmetry.

3. The structure of claim 1 wherein said tunable three-dimensional crystal lattice structure is comprised of amorphous silicon.

4. The structure of claim 1 wherein said movable stub tuner penetrates said tunable cavity laterally.

5. The structure of claim 1 wherein said movable stub tuner has a substantially square cross-section.

6. The structure of claim 1 wherein said movable stub tuner and said actuator are made of substantially the same material.

7. The structure of claim 1 wherein said actuator is thermally actuated.

8. The structure of claim 7 wherein said actuator comprises two actuator arms that thermally expand when a bias voltage is placed across said two actuator arms.

9. The structure of claim 8 wherein said two actuator arms have a thickness to width ratio of at least two to one.

10. The structure of claim 8 wherein said two actuator arms are comprised of a semiconductor material selected from the group consisting of polysilicon and amorphous silicon.

11. The structure of claim 10 wherein said material is doped to modify the conductivity of said semiconductor material.

12. The structure of claim 10 wherein said two actuator arms are comprised of multiple layers of said semiconductor material.

13. The structure of claim 7 wherein said actuator is coupled to a flexure system to linearize the motion of said movable stub tuner.

14. The structure of claim 1 wherein said actuator is electrostatically actuated.

15. The structure of claim 1 wherein said actuator is a parallel plate actuator.

16. The structure of claim 1 wherein said actuator is an electrostatic comb drive actuator.

17. A tunable two-dimensional photonic crystal lattice structure comprising:
   a photonic crystal slab comprising a two-dimensional periodic lattice of substantially circular holes;
   a defect defining a tunable cavity in said two-dimensional periodic lattice;
   a movable stub tuner penetrating into said tunable cavity; and
   an actuator coupled to said movable stub tuner for moving said movable stub tuner to tune said tunable cavity.

18. The structure of claim 17 wherein said actuator is a parallel plate actuator.

19. A method for making a tunable three-dimensional photonic crystal lattice structure comprising:
   providing a region having a tunable cavity;
   providing a movable stub tuner penetrating into said tunable cavity; and
   providing an actuator coupled to said movable stub tuner for moving said movable stub tuner to tune said tunable cavity.

20. A method for making a tunable two-dimensional photonic crystal lattice structure comprising:
   providing a photonic crystal slab comprising a two-dimensional periodic lattice of substantially circular holes;
   providing a defect defining a tunable cavity in said two-dimensional periodic lattice;
   providing a movable stub tuner penetrating into said tunable cavity; and
   providing an actuator coupled to said movable stub tuner for moving said movable stub tuner to tune said tunable cavity.

* * * * *